(12) United States Patent
Keller et al.

(10) Patent No.: US 11,559,836 B2
(45) Date of Patent: Jan. 24, 2023

(54) PULL-TYPE BLIND FASTENER WITH PRELOAD PERFORMANCE

(71) Applicant: ALLFAST FASTENING SYSTEMS, City of Industry, CA (US)

(72) Inventors: Paul Keller, City of Industry, CA (US); Gregory Athas, City of Industry, CA (US); Bob Flores, City of Idustry, CA (US); Dave McNab, City of Industry, CA (US); Ramon Munoz, City of Industry, CA (US)

(73) Assignee: ALLFAST FASTENING SYSTEMS, City of Industry, CA (US)

( * ) Notice: Subject to any disclaimer, the term of this patent is extended or adjusted under 35 U.S.C. 154(b) by 0 days.

(21) Appl. No.: 17/276,185

(22) PCT Filed: Sep. 13, 2019

(86) PCT No.: PCT/US2019/050995
§ 371 (c)(1),
(2) Date: Mar. 15, 2021

(87) PCT Pub. No.: WO2020/056244
PCT Pub. Date: Mar. 19, 2020

(65) Prior Publication Data
US 2022/0040752 A1 Feb. 10, 2022

Related U.S. Application Data

(60) Provisional application No. 62/731,117, filed on Sep. 14, 2018.

(51) Int. Cl.
*B21J 15/04* (2006.01)
*F16B 19/10* (2006.01)

(52) U.S. Cl.
CPC .......... *B21J 15/045* (2013.01); *F16B 19/1054* (2013.01)

(58) Field of Classification Search
CPC . F16B 19/1063; F16B 19/1054; B21J 15/043; B21J 15/045
See application file for complete search history.

(56) References Cited

U.S. PATENT DOCUMENTS

| | | | | |
|---|---|---|---|---|
| 3,369,289 | A | * 2/1968 | Gapp | ...................... B21J 15/043 29/523 |
| 4,142,439 | A | * 3/1979 | Landt | ................... F16B 19/1063 411/34 |
| 4,364,697 | A | 12/1982 | Binns | |

(Continued)

OTHER PUBLICATIONS

International Search Report and Written Opinion dated Nov. 6, 2019; International Patent Application No. PCT/US2019/050995 filed Sep. 13, 2019. ISA/US.

(Continued)

*Primary Examiner* — Bayan Salone
(74) *Attorney, Agent, or Firm* — McDonald Hopkins LLC

(57) ABSTRACT

A blind pull type fastener includes a pin, a sleeve, a collar, and a bulb-forming portion. The pin includes a head. The pin is pulled so that the head applies force to the bulb-forming portion. The bulb-forming portion is deformed to form a bulb. The collar is deformed into a void of the sleeve. The pin includes locking rings. The collar is deformed to lock with the locking rings.

8 Claims, 7 Drawing Sheets

(56) References Cited

U.S. PATENT DOCUMENTS

| | | | | |
|---|---|---|---|---|
| 4,815,906 A | * | 3/1989 | Binns | F16B 19/05 |
| | | | | 411/902 |
| 4,900,205 A | * | 2/1990 | Sadri | F16B 19/1063 |
| | | | | 411/42 |
| 5,213,460 A | * | 5/1993 | Sadri | F16B 19/1063 |
| | | | | 411/361 |

OTHER PUBLICATIONS

Extended European Search Report dated May 10, 2022; European Patent Application No. 19860158.5.

* cited by examiner

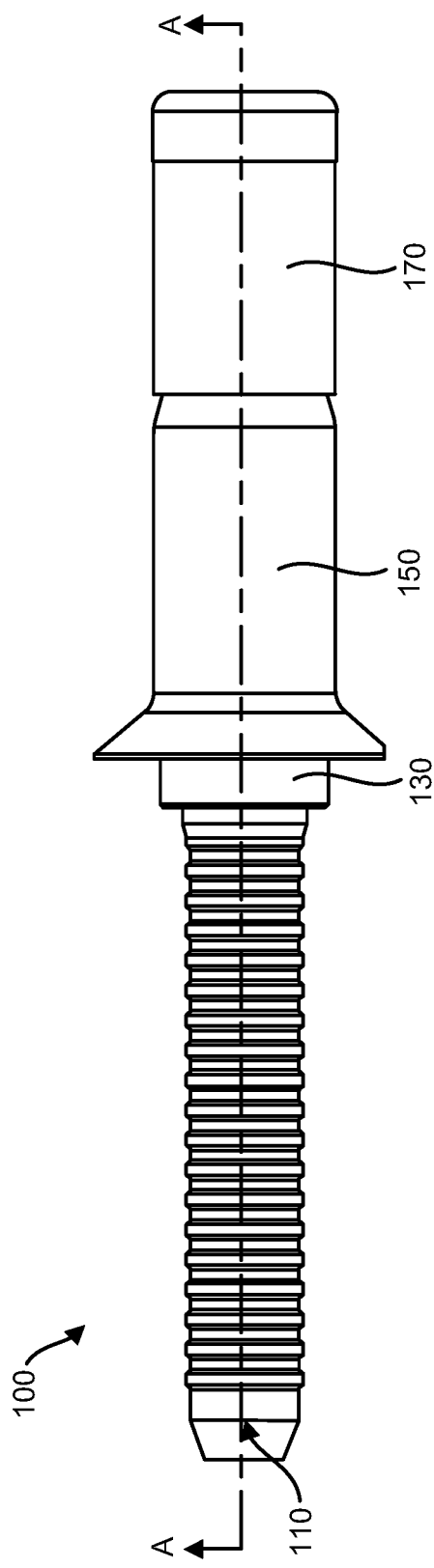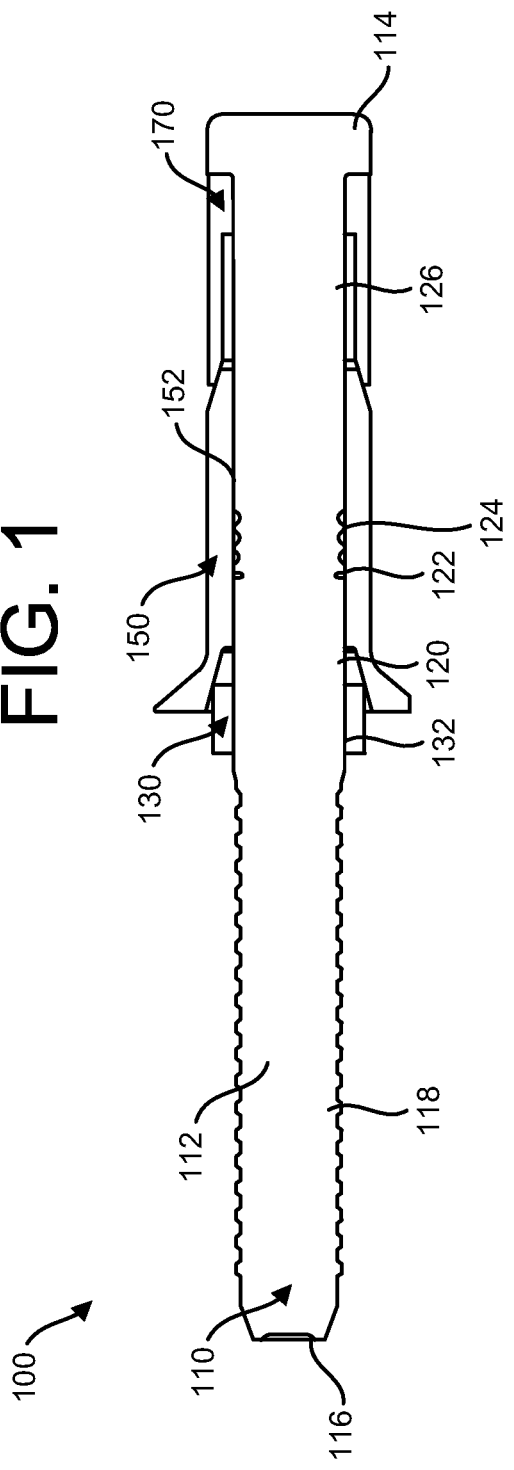

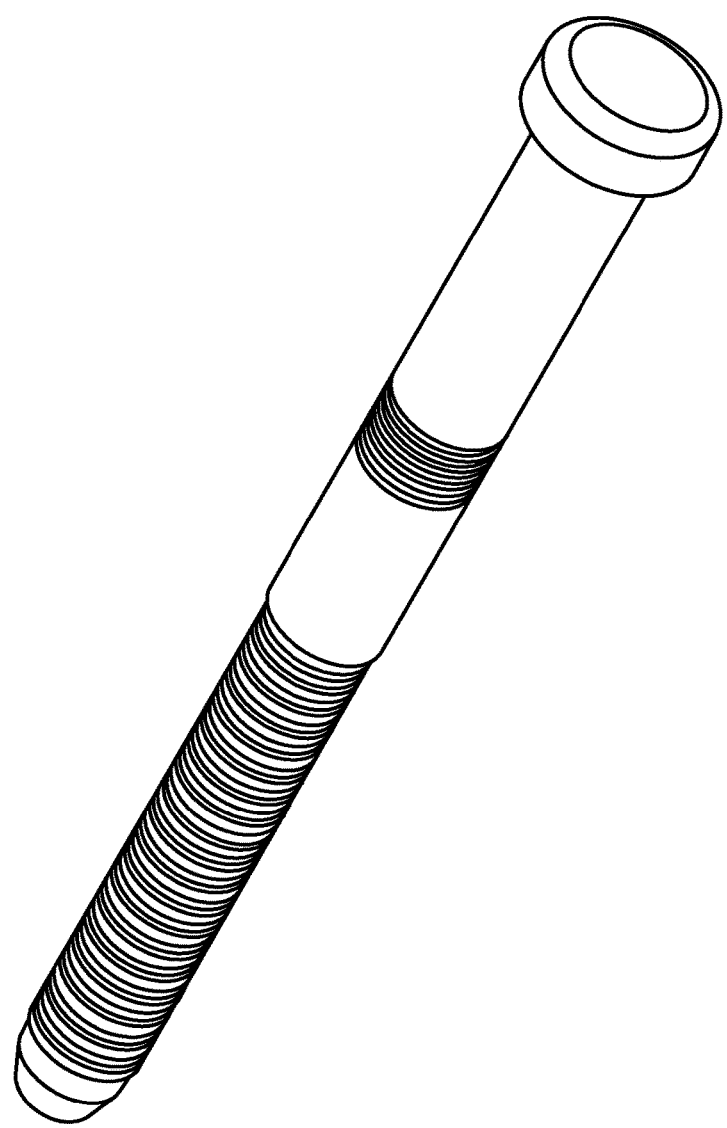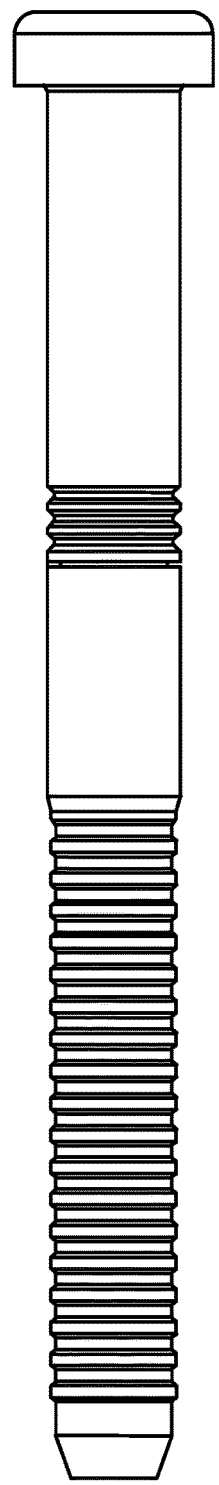
FIG. 3
FIG. 4

PULL-TYPE BLIND FASTENER WITH PRELOAD PERFORMANCE

CROSS-REFERENCE TO RELATED APPLICATIONS

The present application is a 35 U.S.C. 371 national stage filing of PCT Application No. PCT/US2019/050995 filed Sep. 13, 2019, entitled "PULL-TYPE BLIND FASTENER WITH PRELOAD PERFORMANCE," which claims priority to and the benefit of U.S. Provisional Patent Application No. 62/731,117 titled "PULL-TYPE BLIND FASTENER WITH PRELOAD PERFORMANCE" filed on Sep. 14, 2018, the disclosures of each of which are incorporated herein by reference in their entireties.

FIELD OF INVENTION

This disclosure relates to a fastener, and, more specifically, to a recess-free blind fastener that breaks flush with a workpiece.

BACKGROUND

Rivets and other types of fasteners are used in manufacturing to hold workpieces together. Such rivets may hold together metal or other materials and may be high-strength fasteners. In some manufacturing operations, apertures are drilled through workpieces and then rivets are installed in the apertures.

Blind fasteners are traditionally used in the aircraft industry. Such fasteners generally include a nut, a bolt and a sleeve. The nut has a body with a threaded axial bore therethrough. A bolt is threaded in the nut body. A hollow cylindrical sleeve surrounds the bolt between the nut and a head of the bolt. In installation, the fastener is aligned in holes in workpieces. As the bolt is drawn through the bore of the nut, the sleeve is pushed by the bolt head and is deformed against the workpieces thus locking the fastener in position.

Once locked, a portion of the bolt above the workpieces is removed and discarded. This portion typically breaks off from the remainder of the bolt. The surface of the workpiece typically has a resulting protruding tip, pintail, recesses, or other formation so that the installed fastener and the workpiece are not flush. It may be necessary to conduct further operations to make the workpiece and the fastener flush. For example, this may involve shaving off the protruding tip, pintail, or other formation of the remaining fastener after installation which entails considerable man hours or additional automated processes.

For these and other reasons, there is a need for a fastener which operatively breaks flush with a workpiece and does not result in surface formations. Moreover, there is a need for a more efficient fastener, system, and methods for installing a fastener.

BRIEF DESCRIPTION OF THE DRAWINGS

The accompanying drawings illustrate various systems, apparatuses, devices and related methods, in which like reference characters refer to like parts throughout, and in which:

FIG. 1 is a side view of a pull-type blind fastener in accordance with embodiments disclosed herein;

FIG. 2 is a side, cross-sectional view of the pull-type blind fastener of FIG. 1 in accordance with embodiments disclosed herein;

FIG. 3 is a side, perspective view of a pin of the pull-type blind fastener of FIG. 1 in accordance with embodiments disclosed herein;

FIG. 4 is a side view of the pin of FIG. 3 in accordance with embodiments disclosed herein;

DETAILED DESCRIPTION

Figure 5:
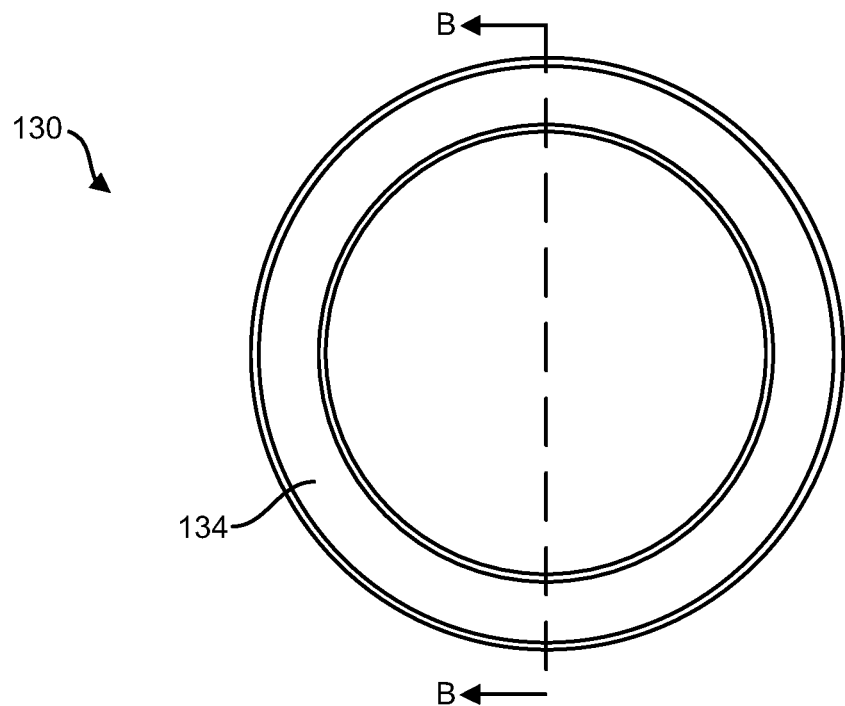
FIG. 5 is a top view of a collar of the pull-type blind fastener of FIG. 1 in accordance with embodiments disclosed herein.

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more", unless context suggests otherwise.

As used herein, terms such as "user," "operator," and the like are employed interchangeably throughout the subject specification, unless context suggests otherwise or warrants a particular distinction among the terms. It is noted that such terms may refer to human entities or automated components such as automated robotic assembly devices. Such devices may be controlled by a user, supported through artificial intelligence (e.g., a capacity to make inference), programmed for a particular user, or the like. For instance, examples describing installing a rivet may include a human user with a hand held installation device, a human operating a robotic arm having an installation device, an automated machine that utilizes an installation device, or the like.

As used herein, a fastener may refer to various types of rivets, screws, bolts, or the like. Such fasteners may comprise metals, plastics, or other materials. For example, fastener may refer to a cylindrical rivet comprising a metal body (e.g., aluminum, steel, etc.). Moreover, embodiments may refer to a specific type of fastener for simplicity of explanation. As such, disclosed aspects may be applicable to various other types of fasteners.

Blind fasteners may be used where there is limited operating room, to reduce installation costs, or to reduce installation time in comparison to two-piece non-blind fasteners. Blind fasteners are more readily and cost effectively adapted to automated or robotic installation than would be a two-piece system. For these and other reasons, blind fasteners are considered for non-typical applications wherein access is available but productivity demands and cost concerns drive the use of automation.

The assembly of aerospace structure components employs the use of many fasteners. Fastener selection is typically based upon many factors that include desired mechanical properties, accessibility to workpiece, and cost. Two exemplary fasteners include aluminum lock bolts and aluminum solid rivets. These two fasteners each provide benefits and limitations to their use. Alternatives to these fasteners exist but present different limitations to their use.

A lock bolt fastener is a two piece design comprised of a pin and a swageable locking collar. The lock bolt type fasteners are non-blind fasteners. The installation of this fastener is accomplished by inserting a pin into an aperture formed through workpieces to be joined. The locking collar is applied to the pin from the opposite side of the work. An installation tool pulls the pin so that the nose of the tool swages the collar onto the pin creating a mechanical lock with the pin. The pull portion of the pin then fractures and is discarded. One of the disadvantages to the use of lock bolts is that both sides of the work to be joined need to be accessible for installation of the fastener.

Solid rivets are a single component fastener, generally made from aluminum alloys, having a head and a shank. Solid rivets are installed by inserting the fastener into an aperture formed through workpieces to be joined. The rivet is restrained on the head side and force is applied to the opposite side, permanently deforming the terminal end of the rivet. One of the disadvantages to the use of solid rivets is that these fasteners are non-blind so that they require that both sides of the work to be joined are accessible to install the solid fastener.

An alternative to lock bolts and solid rivets are blind fasteners of rotary actuation type. These rotary fasteners are typically composed of multiple components. The rotary fasteners provide the desired mechanical properties and require only accessibility to one side of the workpiece. The fastener is inserted into the work and the installation tool actuates the pin in a rotary manner. Depending on the particular fastener, a sleeve component deforms against the side opposite of the fastener head (e.g., the blind side) joining the work and applies preload. A drive portion of the pin fractures and is discarded. These fasteners tend to be more costly (e.g., such as due to materials used, manufacturing costs, or the like) and complexity in manufacture. Prevention of galvanic corrosion between the fastener and work material requires coatings that are costly and/or environmentally unfriendly.

Described herein are assemblies and methods related to a pull-type blind fastener. In embodiments, a fastener may comprise generally four assembled components including a pin, sleeve, collar, and bulb former. The sleeve has a body with a non-threaded axial bore therethrough. The pin is disposed through bore of the sleeve. A collar is disposed at one end of the sleeve and a bulb former is disposed at the other end of the sleeve such that the bulb former is positioned between the sleeve and a head of the pin. In installation, the fastener is aligned in holes in workpieces. As the pin is pulled away from the workpieces, the sleeve is held in place. The pin head is disposed on a blind side and applies force to the bulb former such that it is deformed against the workpieces thus locking the fastener in position. A portion of the pin is broken off and discarded.

The sleeve may comprise a cylindrical body with a head on one end and a frustoconical outer surface on the terminal end. The sleeve has an inner diameter extending through its length and an inner cavity at the end adjacent to the head. The pin comprises a cylindrical body having a head, annular locking grooves, a break notch and annular serrations. The collar may comprise a cylindrical body with an inner diameter passing through the length of the body. The bulb former may comprise a cylindrical body having an inner diameter extending from one end and terminating at the location of a smaller inner diameter that extends to the opposite end.

According to at least one disclosed method for installing fasteners, a pull-type blind fastener may be provided. The fasteners may be positioned in apertures of workpieces to be joined. An installation tool may be utilized to install the fastener. The installation tool may comprise two elements that function to accomplish installation of the fastener, a drawbolt and a nosepiece. The installation tool may comprise other components, such as a motor, a power source, and the like. The draw bolt of the tool engages annular serrations of a pin and the nosepiece of the tool may restrain the fastener via applying force to a collar that holds the sleeve in the workpiece. The draw bolt translates in an axial motion away from the work. As the pin translates toward the head of the sleeve, an inner diameter of bulb former impinges on a terminal end of the sleeve. The bulb former having a smaller inner diameter than the outer diameter of the sleeve deforms in an outward radial fashion. As the pin and bulb former continue to translate, the bulb former impinges on the work opposite the fastener (e.g., the blind side). The bulb former may be deformed in an outward radial direction. In an aspect, the bulb former may comprise a stepped portion of the inner geometry to impinge on the sleeve terminal end restricting further axial translation of the pin.

The pin may be provided with annular rings. The annular rings may be disposed within the aperture of the sleeve. As the pin is drawn through the sleeve, the annular rings may be drawn to a cavity of a head of the sleeve. The volumetric space between the cavity and the annular rings may be generally equal to a volume of the collar. Force applied to the pin, transmitted through the bulb former to the sleeve to one end of the collar and reacted from the nose piece to the opposite end of the collar, creates a compressive loading on the collar. The collar may be deformed to occupy the volumetric space created between the annular rings on the pin and the cavity of the sleeve, forming a mechanical lock. The pin, unable to translate due to obstruction by the bulb former step and now mechanically locked to the sleeve, reaches a critical load. The critical load force is coincident to the ultimate tensile strength of a break notch diameter of the pin. The pin fractures at the break notch diameter upon reaching this critical load. The locking rings of the pin may be configured in such a way as to serve as variable break locations for separation of the pull stem portion of pin from the rest of the pin. This feature may allow a consistent blind side deformation with a variable pin break location.

A shear strength of an installed fastener is a function of the materials selected and the respective thermal treatment. A tensile strength of the installed fastener is a function of the sleeve, bulb former, pin and the mechanical lock formed between the sleeve cavity, annular rings on a pin, and the deformed collar. A residual preload of the installed fastener is a function of the force applied by the sleeve, bulb former and pin interaction during installation of the fastener and is retained by the mechanical lock. The configuration of the individual components is such that the costs to manufacture are lower compared to other types of fasteners. In another aspect, the fastener may be capable of one-sided installation. When installed, the fastener may be flush with a workpiece so that further machining is not needed.

The residual preload of the installed fastener is a function of the force applied by the sleeve, bulb former and pin interaction during installation of the fastener and is retained by the mechanical lock. The combination of aspects described in the disclosed embodiments act to provide residual preload in the work, which is unique to blind pull type fasteners.

Moreover, embodiment disclosed herein may provide aluminum fasteners capable of being installed from only one side of the work, while providing desirable mechanical properties including shear strength, tensile strength, fatigue life and residual preload. This disclosure provides a solution to these and other problems that are more efficient, economically feasible, and improved compared to existing fasteners. The component materials can be changed from aluminum to other alloys to create a fastener that will achieve higher or desired mechanical properties. The design lends itself to function in the manner described herein.

In one example, a pull-type blind fastener comprises a pin comprising a gripping portion; a pin head; and a body extending from the pin head to the gripping portion, wherein the body comprises one or more locking rings and a break off portion. The pin further comprises a collar comprising an internal collar bore that operatively receives the pin, a sleeve comprising an internal sleeve bore that operatively receives the pin, and a bulb-forming portion disposed between the pin head and the sleeve, wherein the sleeve is disposed between the bulb-forming portion and the collar. The bulb forming portion comprises an inner step. The inner step operatively impinges the sleeve during installation to prevent further axial translation of the pin. The force operatively applied by the sleeve, the bulb-forming portion and the pin during installation of the pull-type blind fastener is retained to mechanically lock the pull-type blind fastener in an installed state to provide residual preload. In an example, the sleeve comprises an internal frustoconical portion leading into the internal sleeve bore. In another aspect, the internal frustoconical portion defines a void. It is noted that the collar may be operatively deformed within the void, and between the sleeve and the pin, when the pull-type blind fastener is in an uninstalled orientation. The pin may comprise an aluminum alloy. The sleeve may comprise an aluminum alloy.

A pull-type blind fastener may comprise a pin comprising a gripping portion, a pin head, and a body extending from the pin head to the gripping portion, wherein the body comprises one or more locking rings and at least one break off portion, and wherein the pin head comprises an external diameter that is greater than an external diameter of the body. The pin may further comprise a collar comprising an internal collar bore that operatively receives the body, a sleeve comprising an internal sleeve bore that operatively receives the body, and a bulb-forming portion disposed between the pin head and the sleeve, wherein the sleeve is disposed between the bulb-forming portion and the collar. In an aspect, the at least one break off portion comprises operatively provide variable break of locations to allow for separation of the gripping portion from the body at least one break off portion. In another aspect, wherein the sleeve comprises a head and a frustoconical outer portion. The bulb forming portion comprises a body may comprise a generally cylindrical outer surface and an internal frustoconical surface, wherein the internal frustoconical surface is configured such that a larger diameter is proximal the sleeve. The bulb forming portion may further comprise a thinned wall and a thickened wall, wherein the thinned wall has a lesser thickness than the thickened wall, and wherein the thinned wall is disposed between the thickened wall and the internal frustoconical surface. The bulb forming portion may further comprise a transition portion disposed between the thickened wall and the thinned wall. At least a portion of the frustoconical outer portion of the sleeve may fit within at least a portion of the internal frustoconical surface of the bulb forming portion in an pre-installation orientation.

Also describes is a method of installing a blind fastener, comprising providing a fastener comprising, a pin comprising a gripping portion, a pin head, and a body extending from the pin head to the gripping portion, wherein the body comprises one or more locking rings and a break off portion, a collar comprising an internal collar bore that operatively receives the pin, a sleeve comprising an internal sleeve bore that operatively receives the pin, and a bulb-forming portion disposed between the pin head and the sleeve, wherein the sleeve is disposed between the bulb-forming portion and the collar. The method may include positioning the sleeve within an aperture of a workpiece, applying force in a first direction to the collar, and applying force to the pin in a second direction that is opposite the first direction. The method may include deforming the collar into a compartment defined by the sleeve and the pin. The method may include deforming the bulb forming portion between the workpiece and a stem head of the pin.

Turning to FIGS. 1-2, there is a fastener 100 that may provide for a recess-free, flush break when installed in a workpiece. FIG. 1 shows a side view and FIG. 2 shows a cross-sectional view taken along axis A. The fastener 100 may comprise a pull-type, blind fastener and may comprise aluminum, steel, or other materials. It is noted that the various components of the fastener 100 may comprise the same or different material.

Figure 6:
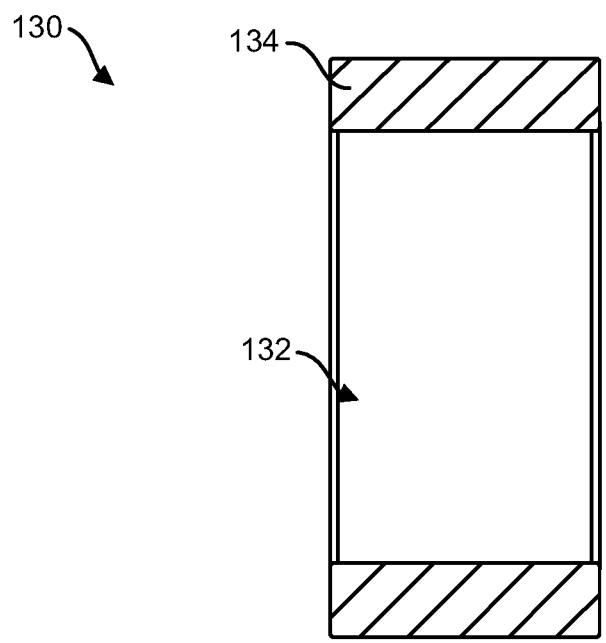
FIG. 6 is a side, cross-sectional view of the collar of FIG. 5 in accordance with embodiments disclosed herein.
Figure 7:
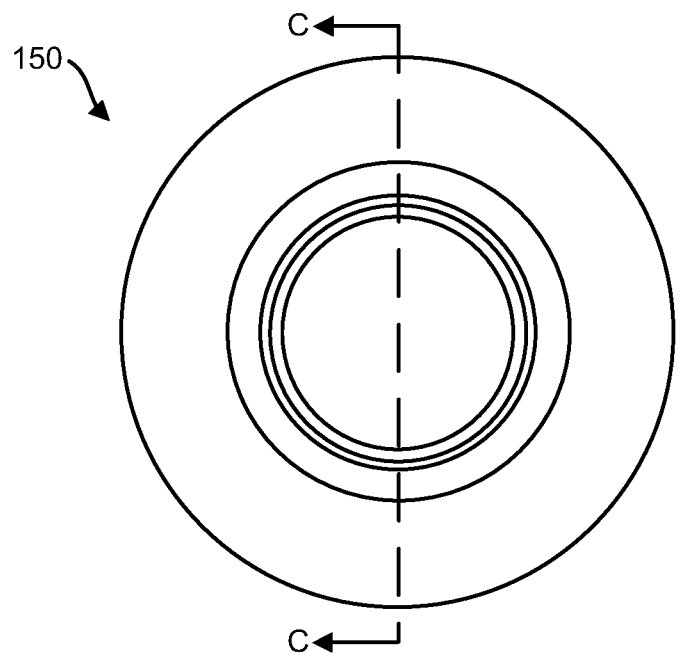
FIG. 7 is a top view of a sleeve of the pull-type blind fastener of FIG. 1 in accordance with embodiments disclosed herein.
Figure 8:
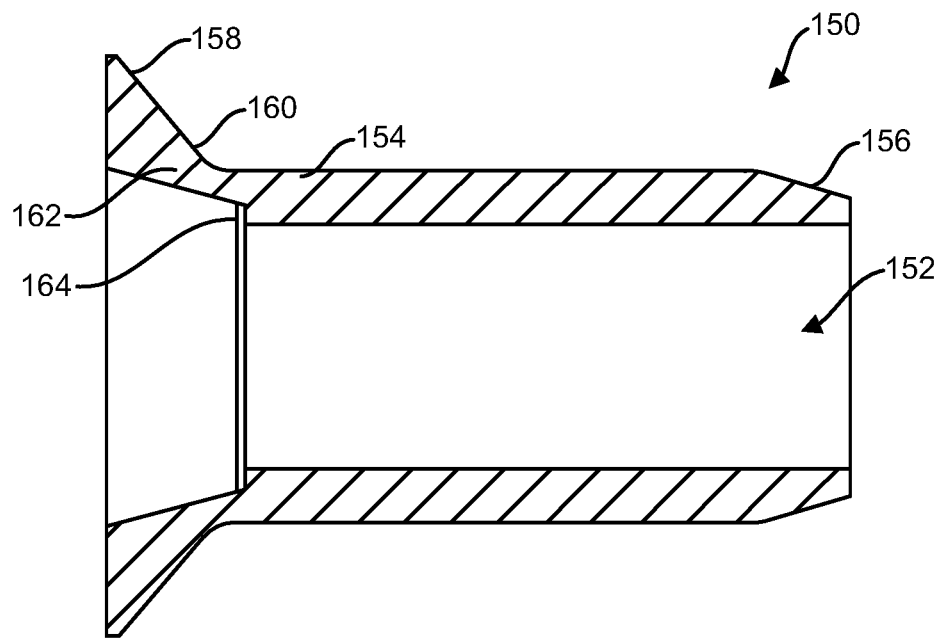
FIG. 8 is a side, cross-sectional view of the sleeve of FIG. 7 in accordance with embodiments disclosed herein.

Fastener 100 generally includes pin 110 (as shown in FIGS. 3-4), collar 130 (as shown in FIGS. 5-6), sleeve 150 (as shown in FIGS. 7-8), and a bulb-forming portion 170. Fastener 100 defines longitudinal axis A-A and is generally symmetric about longitudinal axis A-A. Pin 110 may generally comprise a generally cylindrical body 112 extending from a stem head 114 to a terminal end 116. The pin 110 may comprise serrations 118 that may comprise annular serrations to provide a gripping surface for an installation tool. It is noted that the embodiments may include a pin 110 with other formations that allow for gripping of the pin 110, such as protrusions, threads, recesses, or the like. A first non-serrated portion 120 may be disposed between a break location 122 or annular rings 124 and the serrated portion 118. In an aspect, the first non-serrated portion 120 may be disposed at least partially within an internal bore 132 of the collar 130 and an internal bore 152 of the sleeve 150 in a pre-installation orientation, as shown in FIGS. 1-2.

In embodiments, when in a pre-installation orientation, the annular rings 124 and break location 122 may be disposed within the internal bore 152. A second non-serrated portion 126 may be disposed between the annular rings 124 and the head 114. The bulb-forming portion 170 may be disposed between the head 114 and the sleeve 150.

Turning to FIGS. 5-6 with reference to the other figures, the collar 130 may comprise a generally cylindrical body 134 defining the internal bore 132. A top view of the collar 130 is shown in FIG. 5, and a cross-sectional view taken along axis B-B is shown in FIG. 6. In some embodiments, the internal bore 132 may comprise an internal diameter that is slightly larger than an external diameter of the first non-serrated portion 120.

Turning to FIGS. 7-8 with reference to the other figures, the sleeve 150 may comprise a generally cylindrical body 154, a frustoconical outer portion 156, and a head 158. A top view of the sleeve 150 is shown in FIG. 7, and a cross-sectional view taken along axis C-C is shown in FIG. 8 The internal bore 152 may be formed or defined by the cylindrical body 154, the frustoconical outer portion 156, and the head 158. In an aspect, the head 158 may comprise a generally frustoconical outer portion 160 and a generally frustoconical inner portion 162.

In at least one embodiment, the frustoconical inner portion 162 may terminate at a shoulder 164 disposed between the internal bore 152 and the inner portion 162. The shoulder 164 may define an annular ledge. When the pin 110 is inserted within the sleeve 150, the volumetric space between the pin 110 and the frustoconical inner portion 162 may allow for reception of the collar 130 as described in more detail herein.

Figure 9:
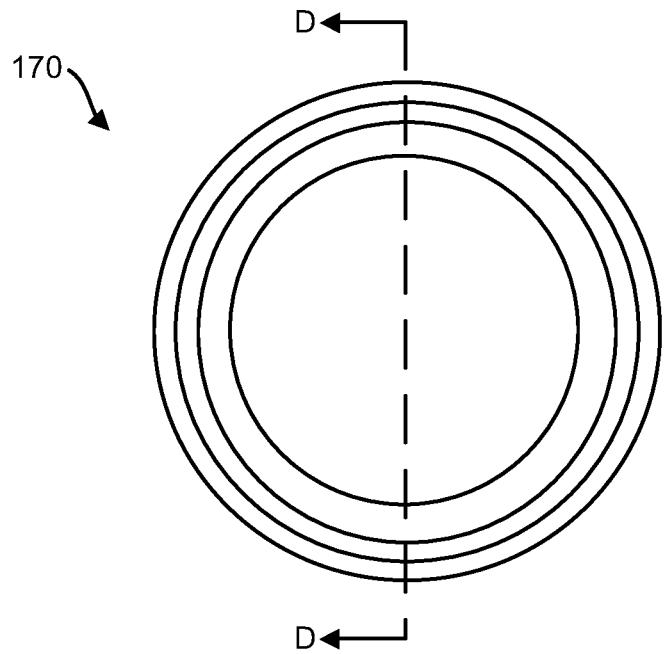
FIG. 9 is a top view of a bulb-forming portion of the pull-type blind tacking fastener of FIG. 1 in accordance with embodiments disclosed herein.
Figure 10:
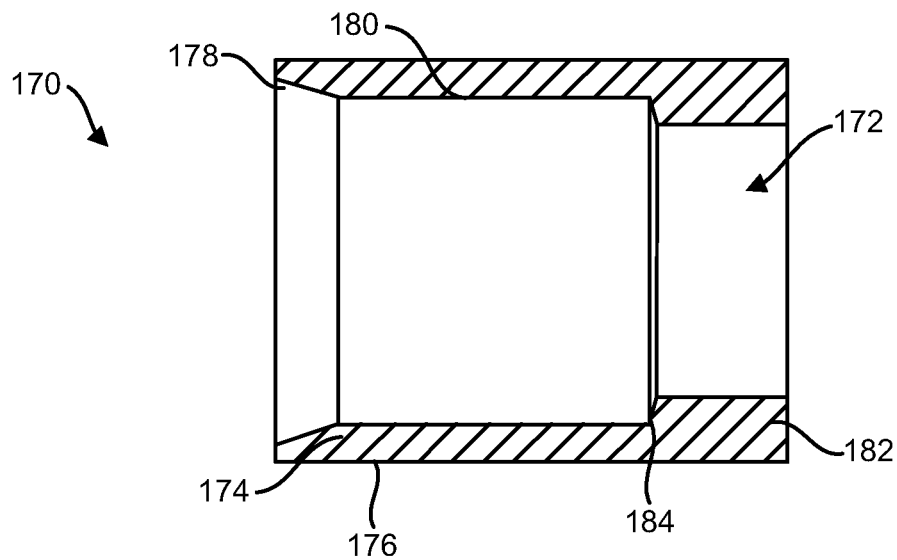
FIG. 10 is a side, cross-sectional view of the bulb-forming portion of FIG. 9 in accordance with embodiments disclosed herein.

Turning to FIGS. 9-10 with reference to the other figures, the bulb-forming portion 170 may comprise a body 174 comprising a generally cylindrical outer surface 176. A top view of the bulb-forming portion 170 is shown in FIG. 9, and a cross-sectional view taken along axis D-D is shown in FIG. 10. The body 174 may comprise different portions having different internal dimensions to allow for installation of the fastener 100 and forming of a bulb as described herein.

In an aspect, the body 174 may comprise a first internal frustoconical portion 178. The frustoconical portion 178 may be sized and shaped to receive the frustoconical outer portion 156 of sleeve 150. For instance, the frustoconical portion 178 may comprise a larger diameter proximal a side facing the sleeve 150, as shown in FIG. 1, and the frustoconical outer portion 156 may comprise a smaller diameter proximal the side facing the bulb-forming portion 170. This may allow for proper alignment of the sleeve 150 and bulb-forming portion 170. As described herein, the arrangement may allow for bulb formation at a thinned wall 180 of the bulb-forming portion 170. While reference numbers 178 and 156 are described as frustoconical, it is noted that other arrangements may be utilized. For instance, one or more of reference numbers 178 and 156 may comprise curved, chamfered, convex/concave, ball-and-socket arrangements, or other arrangements in accordance with various disclosed aspects.

The thinned wall 180 may be disposed between the frustoconical portion 178 and a thickened wall 182. In an aspect the thinned wall 180 may be relatively thinner than the thickened wall 182 to allow for bulb formation. The thickened wall 182 may comprise an internal diameter that is generally equal to or slightly larger than an external diameter of the pin 110. In another aspect, the thinned wall 180 may be separated from the thickened wall 182 by a transition portion 184. The transition portion 184 may comprise a lip, ledge, or internal frustoconical shaped surface.

Figure 11:
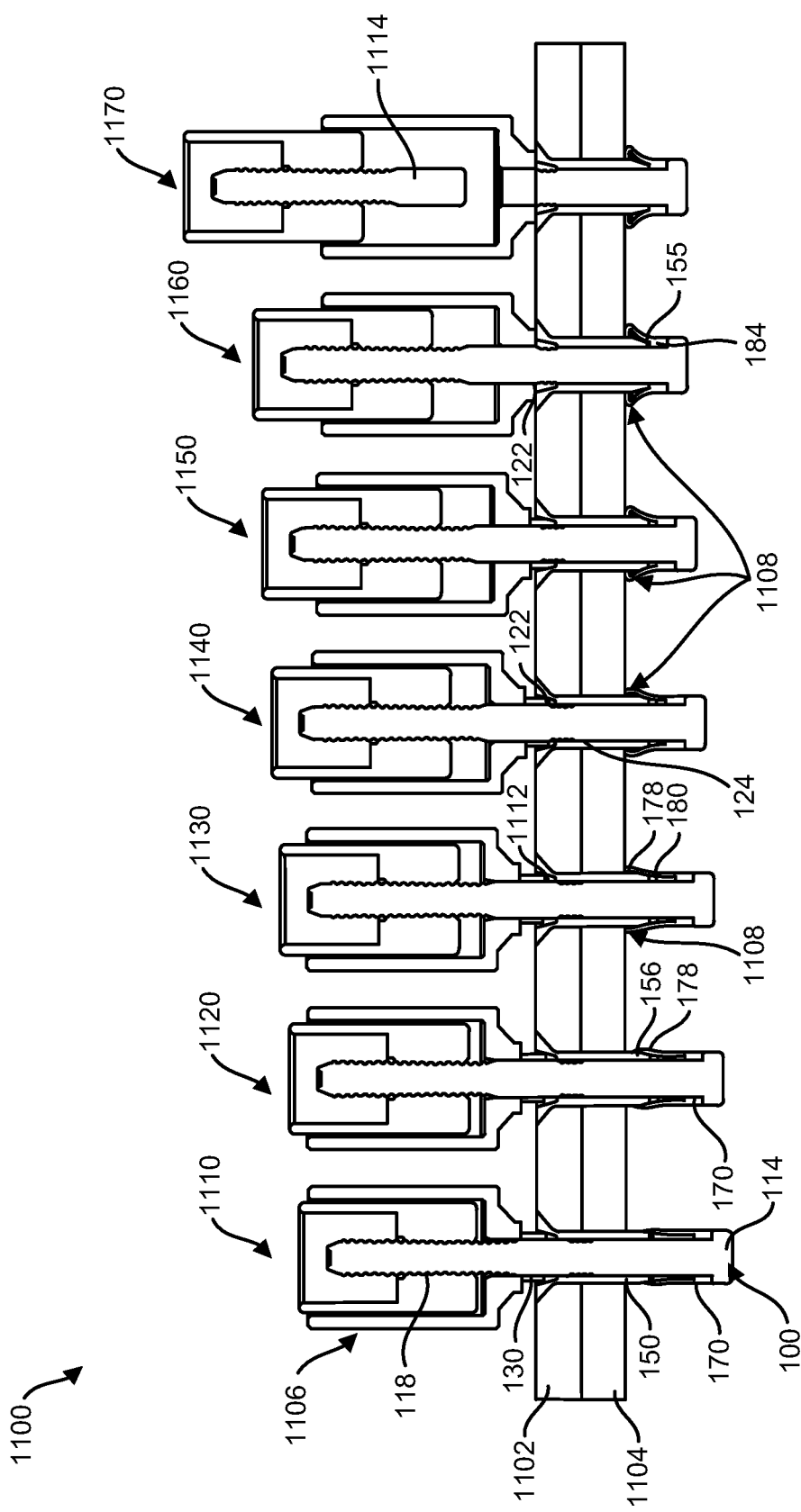
FIG. 11 is a side, cross-sectional view of an installation process of the pull-type blind fastener of FIG. 1 in accordance with embodiments disclosed herein.

The construction and arrangement of the various described portions may allow for installation of the fastener 100 as described in FIG. 11. It is noted that various disclosed methods may be utilized for installing the fastener 100. Moreover, actions may be automated, manual, or a combination of automated and manual. In some embodiments, the order of operations may be changed or some actions may be different or omitted.

Installation process 1100 may manipulate the fastener 100 to install the fastener 100 within workpieces 1102 and 1104 via an installation tool 1106. At reference number 1110, the installation tool 1106 may grasp the pin 110 via serrations 118. The sleeve 150 may be disposed within an appropriately sized aperture formed through the workpieces 1102 and 1104. The head 114 and the bulb-forming portions 170 are disposed at the blind side. In another aspect, a portion of the installation tool 1106 may be disposed against the collar 130.

At 1120, the installation tool 1106 pulls the pin 110 away from the workpieces in an upward direction relative to the orientation shown in FIG. 11. While the pin 110 is pulled, the collar 130 is held in place to prevent the sleeve 130 from being removed from the workpieces 1102 and 1104. On the blind side, the bulb-forming portion 170 is pulled over the sleeve 150 by force of the head 114. In an aspect, the frustoconical portion 156 may act as a ramp to guide frustoconical portion 178 and deform the frustoconical portion 178 in an outward direction.

At 1130, the installation tool 1106 may continue to hold the collar 1130 in position and pull the pin 110 so that the head 114 applies further force to the bulb-forming portion 170. This may cause the thinned wall 180 to deform as the frustoconical portion 178 is pulled towards workpiece 1104. As can be seen, a deformed portion 1108 of the bulb-forming portion 170 is deformed such that it is too large to pass through the apertures formed within or through the workpieces 1102 and 1104.

At 1140 and 1150, the installation tool 1106 may continue to hold the collar 1130 in position and pull the pin 110 so that the head 114 applies further force to the bulb-forming portion 170 so that the deformed portion 1108 may curl or otherwise deform against the workpiece 1104 to lock the fastener into place. In another aspect, the collar 130 may be pushed downward into a void 1112 or cavity defined by the inner frustoconical portion 162 of the sleeve. The void 1112 may create a compartment when the pin 110 is positioned therein, such that the compartment is defined by the pin 110 and the sleeve 150. This volumetric space may be generally sized and shaped so that the collar 130 may be completely disposed within the void 112 while the inner bore 132 of the collar 130 is deformed around the inner rings 124 of the stem 110. In an aspect, the deformation of the inner bore 132 may allow for locking engagement of the collar 130 to the pin 110.

Figure 12:
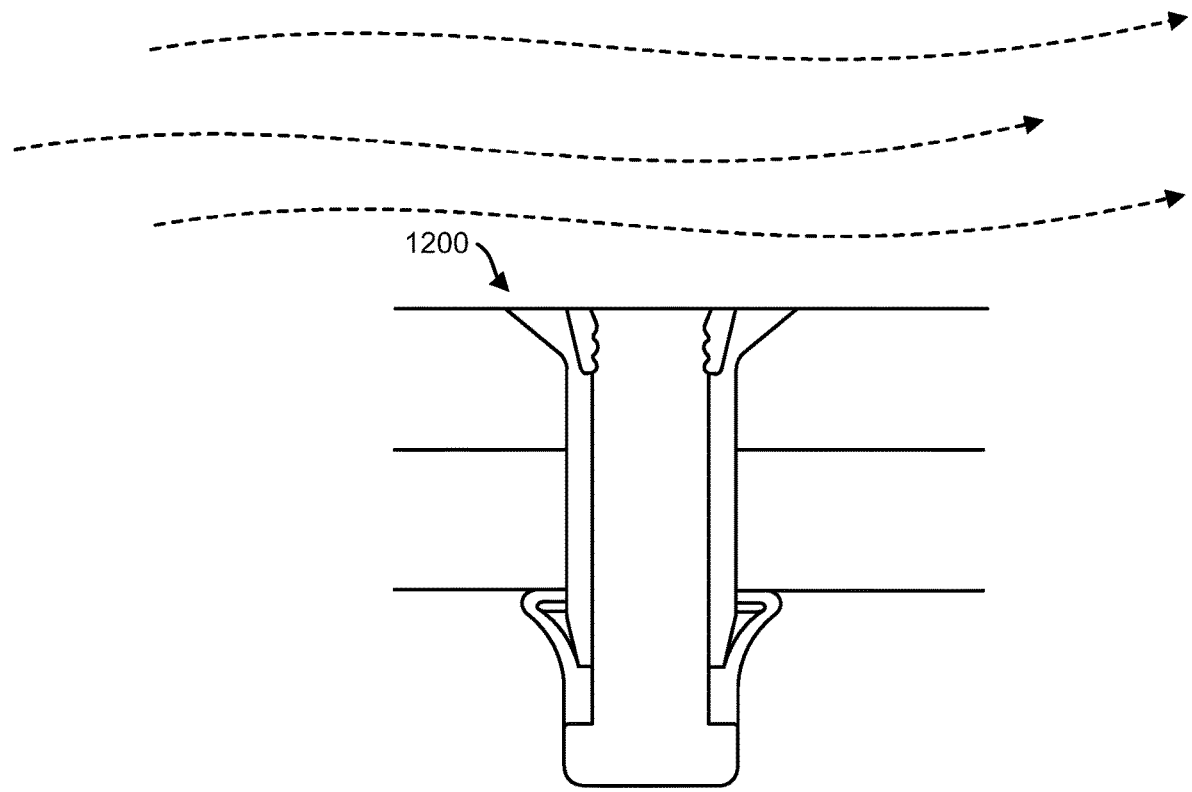
FIG. 12 is a side, cross-sectional view of the pull-type blind fastener of FIG. 1 in installed orientation in accordance with embodiments disclosed herein.

As shown at 1160, the pin 110 may be pulled so that the inner rings 124 are engaged with the collar 130 and the break location 122 is disposed coincident to top of the workpiece 1102 relative to the orientation shown in FIG. 11. In an aspect, the installation tool 1106 may break off or remove a break off portion 1114 of the pin 110. This break off portion 1114 may be discarded. FIG. 12 illustrates a flush surface 1200 resulting from the installation of fastener 100. As described herein, the transition portion 184 comprises a stepped portion of the bulb former 170 inner geometry that impinges on the sleeve terminal end 155 restricting further axial translation of the pin 110. This configuration acts to control the flushness of the resultant installed fastener and align the break location 122 with a surface of the workpiece 102.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pull-type blind fastener comprising:
   a pin comprising: a gripping portion; a pin head; and a body extending from the pin head to the gripping portion, wherein the body includes a plurality of axially spaced annular rings so that one of the axially spaced rings serves as a variable break location;
   a collar comprising an internal collar bore that operatively receives the pin;
   a sleeve comprising an internal sleeve bore that operatively receives the pin; and
   a bulb-forming portion disposed between the pin head and the sleeve, with the bulb forming portion having a hollow cylindrical body with a constant outer diameter and an inner diameter that gradually reduces from an internal frustoconical surface at an edge of the body coming into contact with the sleeve to a final narrowed diameter at an edge of the body coming into contact with the pin head;
   wherein the sleeve is disposed between the bulb-forming portion and the collar; and
   wherein a volume of the collar is selected so that, after the pull-type fastener is installed and the body breaks at the variable break location, the collar deforms and is completely disposed within a void space defined by a frustoconical inner bore of the sleeve and the pin, thereby creating a substantially flush surface.

2. The pull-type blind fastener of claim 1, wherein the bulb forming portion comprises an inner step.

3. The pull-type blind fastener of claim 2, wherein the inner step operatively impinges the sleeve during installation to prevent further axial translation of the pin.

4. The pull-type blind fastener of claim 1, wherein the pin comprises an aluminum alloy.

5. The pull-type blind fastener of claim 1, wherein the sleeve comprises an aluminum alloy.

6. The pull-type blind fastener of claim 1, wherein the bulb forming portion further comprises a thinned wall and a thickened wall, wherein the thinned wall has a lesser thickness than the thickened wall, and wherein the thinned wall is disposed between the thickened wall and the internal frustoconical surface.

7. The pull-type blind fastener of claim 6, further comprising a transition portion disposed between the thickened wall and the thinned wall.

8. The pull-type blind fastener of claim 1, wherein a frustoconical outer portion of the sleeve fits within at least a portion of the internal frustoconical surface of the bulb forming portion before the pull-type fastener is installed and the body breaks at the variable break location.

* * * * *